(12) United States Patent
Garcia Manchado (10) Patent No.: US 9,106,350 B2
(45) Date of Patent: Aug. 11, 2015

(54) METHOD FOR AUTOMATICALLY LOCATING RADIO STATIONS

(75) Inventor: Nilo Garcia Manchado, Torrejón de Ardoz (ES)

(73) Assignees: CRAMBO, S.A., Madrid (ES); GARCIA MANCHADO, NILO, Madrid (ES)

( * ) Notice: Subject to any disclaimer, the term of this patent is extended or adjusted under 35 U.S.C. 154(b) by 408 days.

(21) Appl. No.: 13/510,860

(22) PCT Filed: Nov. 18, 2010

(86) PCT No.: PCT/ES2010/070742
§ 371 (c)(1),
(2), (4) Date: Aug. 6, 2012

(87) PCT Pub. No.: WO2011/061374
PCT Pub. Date: May 26, 2011

(65) Prior Publication Data
US 2012/0315926 A1    Dec. 13, 2012

(30) Foreign Application Priority Data

Nov. 18, 2009   (ES) .................................. 200931013
Dec. 4, 2009    (ES) .................................. 200931115
Feb. 17, 2010   (ES) .................................. 201030221

(51) Int. Cl.
H04W 24/00   (2009.01)
H04M 1/00    (2006.01)
H04W 4/00    (2009.01)
H04W 40/00   (2009.01)
H04B 1/18    (2006.01)
H04H 60/42   (2008.01)
G06F 17/30   (2006.01)
G01S 5/02    (2010.01)
H04H 20/93   (2008.01)
H04H 60/46   (2008.01)
H04H 60/51   (2008.01)
H04W 64/00   (2009.01)
H04N 21/258  (2011.01)
H04N 21/422  (2011.01)
H04L 29/08   (2006.01)

(52) U.S. Cl.
CPC ......... *H04H 60/42* (2013.01); *G06F 17/30029* (2013.01); *G01S 5/02* (2013.01); *H04H 20/93* (2013.01); *H04H 60/46* (2013.01); *H04H 60/51* (2013.01); *H04L 67/306* (2013.01); *H04N 21/25883* (2013.01); *H04N 21/25891* (2013.01); *H04N 21/42202* (2013.01); *H04W 64/00* (2013.01)

(58) Field of Classification Search
CPC ....... H04H 60/27; H04H 60/33; H04H 60/80; H04H 2201/40; H04H 60/46; H04H 60/51; H04H 20/34; H04H 60/16; H04H 60/17; H04H 60/37; H04H 60/40; H04H 60/43; H04H 60/47; H04H 60/58; H04H 60/63
USPC .......... 455/161.2, 161.3, 179.1, 186.1, 161.1, 455/184.1, 410, 426.1, 456.3, 446, 552.1
See application file for complete search history.

(56) References Cited

U.S. PATENT DOCUMENTS 6,591,103 B1 *   7/2003   Dunn et al. .................... 455/436
2003/0013425 A1 * 1/2003   Nee ............................. 455/186.1

(Continued)

*Primary Examiner* — Inder Mehra
(74) *Attorney, Agent, or Firm* — Arent Fox LLP (57) ABSTRACT

Method and device for automatically locating radio stations, of the type which comprises at least a first database of radio and/or television stations (1, 21, 31), which includes the geographical location points or position of the station (13, 221), dial (14, 222) and/or on-demand broadcasting URL address (321), as well as a second database of user profiles (2, 22, 32) which also comprises at least one user profile configured according to the listening preferences of said user by means of a series of fields (11, 211, 311).

8 Claims, 6 Drawing Sheets

(56) References Cited

U.S. PATENT DOCUMENTS

| | | | |
|---|---|---|---|
| 2003/0032399 A1* | 2/2003 | Slupe | 455/161.2 |
| 2003/0106061 A1* | 6/2003 | Gusler et al. | 725/59 |
| 2005/0024264 A1* | 2/2005 | Harrison | 342/357.13 |
| 2005/0198193 A1* | 9/2005 | Halme | 709/217 |
| 2008/0010372 A1* | 1/2008 | Khedouri et al. | 709/224 |
| 2008/0262839 A1* | 10/2008 | Nonaka et al. | 704/246 |
| 2009/0249394 A1* | 10/2009 | Schwesinger et al. | 725/39 |
| 2010/0037151 A1* | 2/2010 | Ackerman et al. | 715/753 |
| 2010/0056163 A1* | 3/2010 | Schmidt et al. | 455/446 |

* cited by examiner

METHOD FOR AUTOMATICALLY LOCATING RADIO STATIONS

CROSS-REFERENCED TO RELATED APPLICATION

This application is a National Stage entry of International Application No. PCT/ES2010/070742, filed Nov. 18, 2010, which claims priority to Spanish Patent Application Nos. P 200931013, filed Nov. 18, 2009; P 200931115, filed Dec. 4, 2009; and P 201030221 filed Feb. 17, 2010; the disclosure of the prior applications are incorporated in their entirety by reference.

The object of the present invention is a method for locating dials of radio stations through a navigator device of the type GPS, or similar, which is configured to provide to the user a list of possible radio dials for said location, by at least one of the following ways:

- The use of the GPS coordinates provided by the device, avoiding the problems of coverage and use of RDS technology of radio receivers.
- The use of the position of mobile telephony cells provided by the network and/or WiFi antennas, avoiding the problems of coverage and use of RDS technology of radio and/or television receivers.
- The use of a connection of the type GPRS/UMTS/HSDPA or higher than all those radio station or television network to which is connected at that time via streaming, avoiding the problems of coverage and use of RDS technology in radio and/or television receivers.

STATE OF THE PRIOR ART

Currently, it is quite common that in road journeys the coverage of a particular radio station on frequency modulation (FM) is lost, since this is the most used service, rather than the medium wave (AM), especially on routes where the terrain is craggy.

Generally, FM radio broadcasting have a typical coverage between 50 and 70 kilometers, after which, if the receiver is of type RDS (Radio Data System) it can be sought automatically the same radio station in another post or antenna if the broadcast has been properly codified. The RDS technology is a standard of the European Broadcasting Union to send a small amount of digital information, such as the code of the broadcasting network, using radios of the type conventional FM.

However, in a majority of cases, stations have no other transmitting antenna so the coverage is lost, forcing the user to distract and manually locate a new station, which does not to have to be in accord with his/her liking or needs. Similarly, it may also be the case, the same station, in various posts, does not contain the same coded information, so the RDS system becomes useless (this event occurs often when it comes to "associated" posts but with different ownership with respect to the main broadcasting network).

It is therefore necessary a method and a device to inform the user about a given broadcast in a given geographical point regardless of the digital information provided by broadcast (RDS) and under some profiles predefined by the user.

Another technical problem that arises now is that the broadcasts of multimedia content on demand over the Internet, known as streaming, have become popular in recent years, together with the improvement in communications and access systems to internet via mobile phone. It is therefore interesting to get a method and a device allowing the connection with the radio broadcast chosen via streaming, when the main broadcast via radio is lost, regardless of the digital information provided by broadcast (RDS) and under some profiles predefined by the user.

EXPLANATION OF THE INVENTION

In order to solve the technical problems described, which lie in the independence of the location of a given broadcast of the digital information of the broadcast, and thanks to the satellite location coordinates, it is proposed the present invention which is a method of locating radio stations by means of a device of the type GPS or the like, which comprises at least, a first database of radio stations and which includes its location points and coverage, as well as a second database of user profiles which also comprises at least one user profile configured according to the listening preferences of said user; wherein said method is characterized in that it comprises:
(a) defining at least one user profile in the second user database, and wherein said user profile comprises, at least, a listening preference by said user;
(b) establishing at least one user location point or GPS coordinates of said user position; and
(c) indicating to the user, depending on the current location of the user established in (b) and on the set preferences in (a), a station in accordance with said features at said point, indicating the exact dial of the station or stations that have coverage at said point and match with the user preferences.

In one aspect of the invention the method in its first embodiment is implemented in a device for automatically locating radio stations using GPS technology, of the type which comprises at least a first database of radio stations and which includes the geographical location points and dial, as well as a second database of user profiles which also comprises at least one user profile configured according to the listening preferences of said user by means of a series of fields. This device can be independent or integrated into a mobile phone.

In addition, in this first practical embodiment of the device of the invention, the navigator and the radio may be integrated, the dial being connected automatically.

In a second particular embodiment of the invention, the method for locating radio and/or television stations using a mobile phone, or the like, comprises, at least a first database of radio and/or television stations and which includes its location points and coverage, as well as a second database of user profiles which comprises at least one user profile configured according to the listening preferences of said user; wherein said method is characterized in that it comprises:
(a) defining at least one user profile in the second user database, and wherein said user profile comprises, at least, a listening preference by said user;
(b) establishing at least one user location point by identifying the mobile telephony cell and/or WiFi antenna that provides it coverage; and
(c) indicating to the user, depending on the current location of the user established in (b) and on the set preferences in (a), a station in accordance with said features at said point, indicating the exact dial of the station or stations that have coverage at said point and match with the user preferences.

This second particular embodiment of the method is implemented into a device for automatically locating radio and/or television stations by identifying the mobile telephony cells in coverage, of the type which comprises at least a first database of radio and/or television stations and which includes the geographical location points and dial, as well as a second database of user profiles which also comprises at least one user profile configured according to the listening preferences of said user by means of a series of fields. This device can be independent or integrated into the mobile phone itself.

In an aspect of this second practical embodiment, the mobile phone and the radio and/or television may be integrated, the dial being connected automatically.

Finally, in a particular embodiment of the invention, the device can be equipped with GPRS means, in such a way that the device can send a signal or communication to the radio and/or television station.

In a third practical embodiment of the invention and thanks to the Internet connection of the device itself that locates the streaming broadcast of the station which is being currently heard, if it is defined within a database integrated into the device itself, or providing a new station if this streaming broadcast is not available.

In this third particular embodiment of the invention, the method for automatically capturing on-demand radio stations by a mobile phone, or the like, which comprises at least data connectivity means and a database of radio and/or television stations, including the on-demand broadcasting URL address and the type of characteristic broadcast, as well as a data base of use profiles which also comprises at least one user profile configured according to the listening (or viewing) preferences of said user; and wherein said method is characterized in that it comprises the steps of:

(a) defining at least one user profile in the database of profiles, and wherein said user profile comprises, at least, a listening preference by said user;

(b) establishing when the coverage of the listening station is lost, and connecting with the on-demand broadcasting URL address corresponding to the database of stations;

and wherein in the event that the on-demand broadcast was not available (there was no link or it was truncated), a list of proposals of connections appropriate to the user profile indicated in the second database will be provided to the user.

This third embodiment of the method is implemented into a device for automatically capturing on-demand radio stations, of the type comprising data connectivity means GPRS/UMTS, or equivalent, and at least a first database of radio and/or television stations with its corresponding on-demand broadcasting URL, address, as well as a second database of user profiles which also comprises at least one user profile configured according to the listening preferences of said user by means of a plurality of fields. This device can be independent or integrated into the mobile phone itself.

In a second aspect of the invention the mobile phone and the radio and/or television can be integrated, playing the radio and/or television the broadcast captured by the mobile phone.

Throughout the description and claims the word "comprises" and its variants are not intended to exclude other technical characteristics, additives, components or steps. To those skilled in the art, other objects, advantages and features of the invention are derived in part from the description and in part from the practice of the invention. The following examples and drawings are provided by way of illustration and they are not intended to be limiting of the present invention. In addition, the present invention covers all the possible combinations of particular and preferred embodiments here indicated.

DETAILED DESCRIPTION OF EMBODIMENTS OF THE INVENTION

Example 1

Location of the User Position by GPS Coordinates

Figure 1:
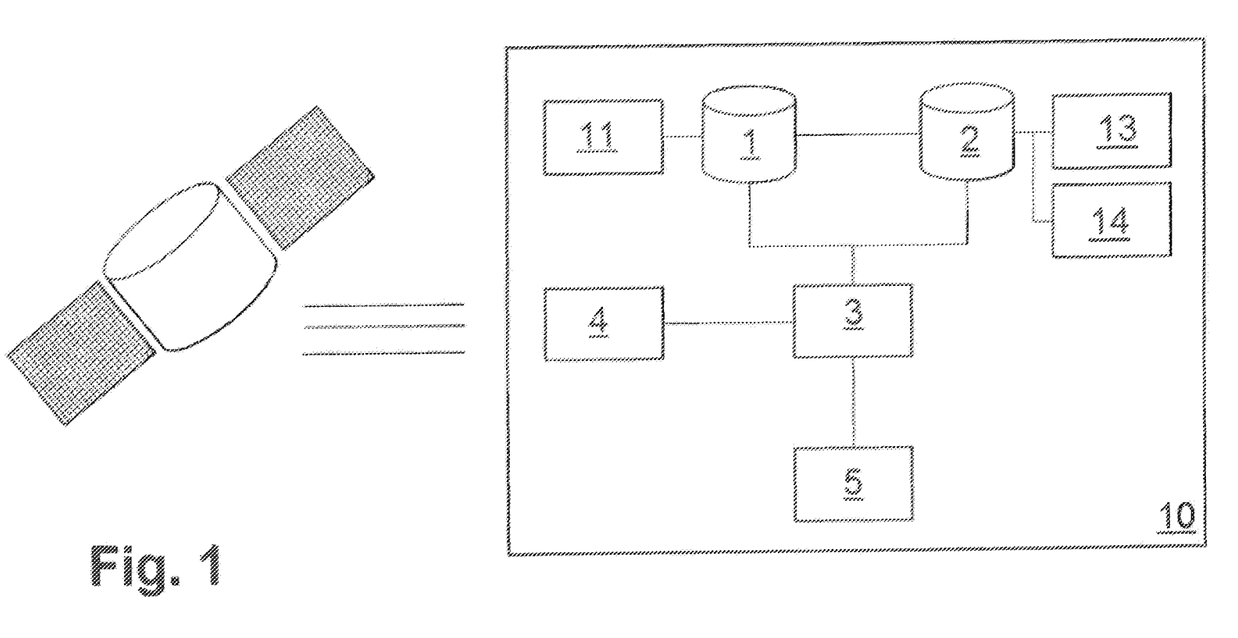
FIG. 1 shows a schematized diagram of the device object of the present invention in a first practical embodiment, with location of the user position by GPS coordinates.

As can be seen in the accompanying figures, and more specifically in the FIG. 1 the device and method object of the present invention starts, in its preferred embodiment, with the definition of a plurality of profiles, in a database of profiles (1) integrated into the device (10) with a capacity of location and GPS-type navigation.

In this first database of profiles (1) the user will define, at least, a profile of listening by means of a plurality of fields (11), wherein these fields are, by way of non-limitative example, the language of broadcast, the station category (radio formula, general, sports, etc.), and/or the type of programming broadcasted at that specific time (economic information, classical music, sports broadcasts, etc.).

Similarly, the second database of radio stations (2) defines a plurality of stations categorized with the same fields as the first database of profiles (1) and including, in addition, an extra field (13) with the location coordinates of the transmitting antenna and another with the dial of said antenna (14). With these data it will be enough the location, therefore it is understood that the coverage of said antennas will be comprised up to a maximum of 70 km without taking into account the orography of the terrain, being able to implement an algorithm that, depending on the orography or the terrain will reduce the radius of coverage, since, for mountainous areas, is rarely possible locating a radio station at a distance greater than 20 km.

Figure 2:
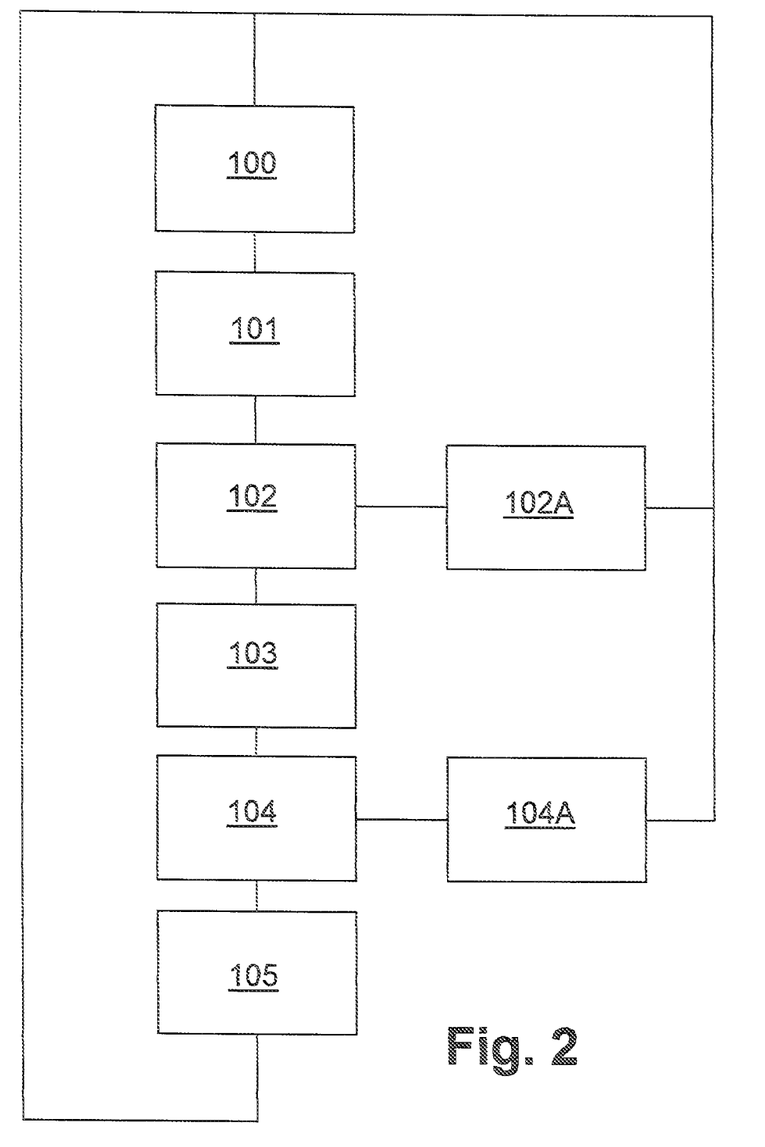
FIG. 2 shows a flow diagram of the algorithm for automatically locating radio stations, according to a first embodiment of the invention, with location by GPS coordinates.

In the next stage of the method, the GPS device will define the location coordinate (4) of the device (10) and, therefore, of the user, establishing a search of the station suitable for this particular position, according to the following algorithm (3), as shown in the FIG. 2:

```
Start (100)
{
    If current_position = then "x" searchs_station_position (101);
    {
        if station_position == current_position (102);
        {
            then searchs_user_profile (103);
            if station_profile == user_profile (104);
            {
                then shows_dial (105);
```

```
        }
        if no message displayed ("no appropriate profile");
        station list (104A);
    }
    if no message displayed ("no stations in coverage"); (103A);
  }
}
in other case return (100);
```

That is, first of all, the matches (101) of the current position (4) will be sought with the station position (13), which has a radius of coverage variable depending on the orography, for example 70 km for flat terrain and 20 km for mountainous terrain.

At the time that match (102) in the second database of stations (2) is located, it seeks that the preferences (103) defined by the user in the first database of profiles (1) match between them (104), showing the dial in positive case (5, 105).

If not, and if the cause is the lack of profile (104A) a message of the type "out profile stations" will be display but listing stations with coverage, in case the user decides to change the profile or listen to another type of station regardless of the defined profile. Finally, if the cause is the lack of coverage of any station, a message of lack of coverage (103A) will be displayed.

In any case, always it will be indicated the distance remaining until the next coverage area, so that the user is informed.

The method of the invention, in other preferred embodiment, comprises a recording stage of a second favorite broadcast, in such a way that it can subsequently be broadcasted at the user's will. This means that, for example, if the route runs through an area where there is no coverage either there is no appropriate listening profile, the user is able to reproduce a broadcast that matches with their linking but it happened while he/she listened to another live program.

Similarly, the method comprises a stage of reproduction of routines of radio broadcast based on the route selected by the user. Thus, one possibility is to define a listening profile for a specific route, for example, always listening news when I return home or similar.

The method regularly repeats every "t" time periods. In a preferred embodiment, the GPS device and radio will be integrated, the dial being launched automatically to the radio and connecting.

Another point to consider is the possibility that the complete management of the radio is carried out from the device itself (10) with a built-in radio receiver and connecting with the vehicle radio itself for broadcasting the signal received in a gap of the spectrum wherein there is no emission.

Example 2

Location by Identification of Mobile Telephony Cells

Figure 3:
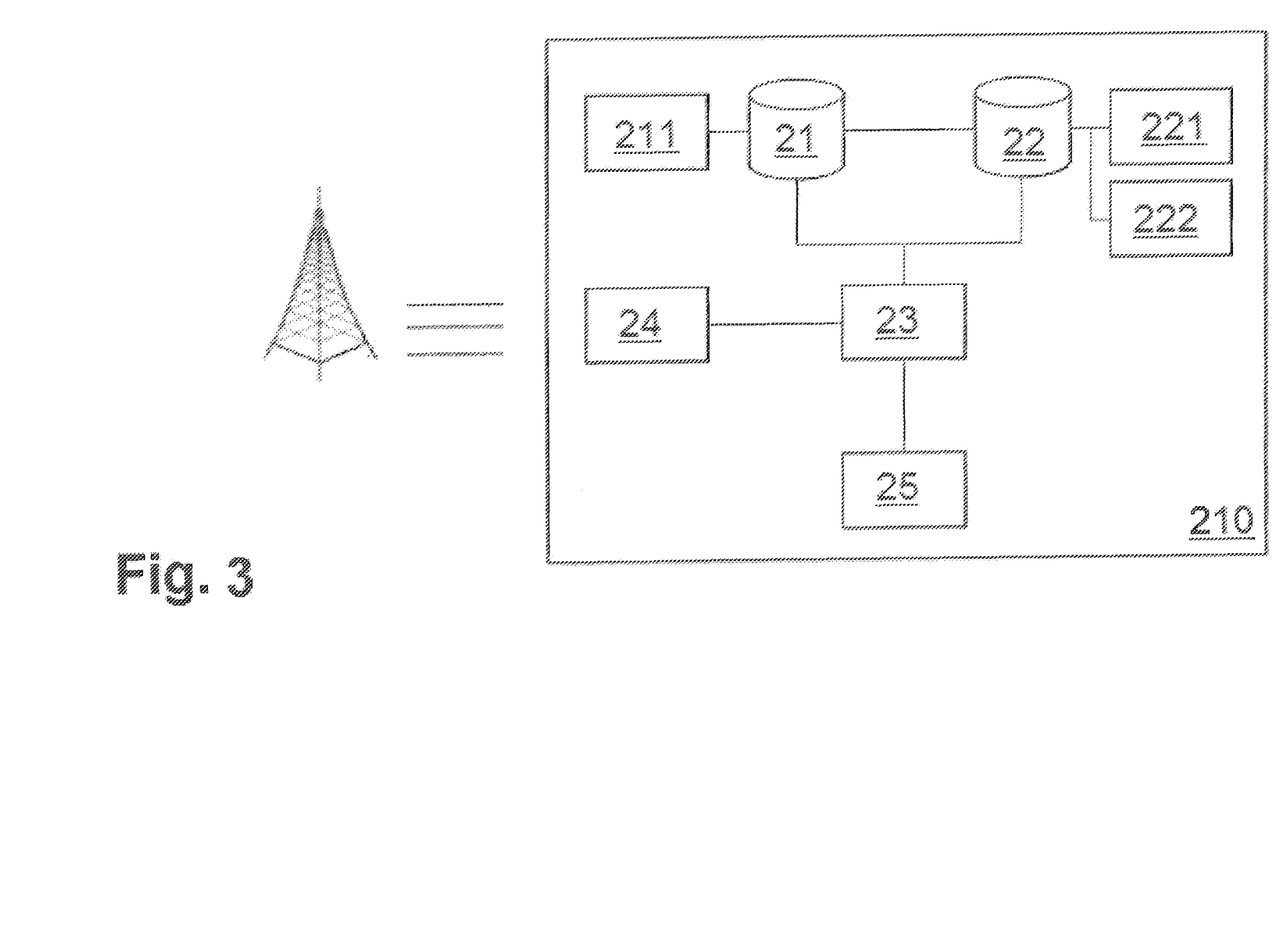
FIG. 3 show a schematized diagram of the device object of the present invention in a second practical embodiment, with location of the user position using mobile telephony cells.

As can be seen in the accompanying figures, and more specifically in the FIG. 3 the device and method object of the present invention starts, in its preferred embodiment, with the definition of a plurality of profiles, in a database of profiles (21) integrated into the device (210) with a capacity of location by identification of the mobile telephony cells in coverage and/or WiFi antennas.

In this first database of profiles (21) the user will define, at least, a profile of listening by means of a plurality of fields (211), wherein these fields are, by way of non-limitative example, the language of broadcast, the station category (radio formula, general, sports, etc.), and/or the type of programming broadcasted at that specific time (economic information, classical music, sports broadcasts, etc.).

Similarly, the second database of radio stations (22) defines a plurality of stations categorized with the same fields as the first database of profiles (21) and including, in addition, an extra field (221) with the location coordinates of the transmitting antenna and another with the dial of said antenna (222). With these data it will be enough the location, therefore it is understood that the coverage of said antennas will be comprised up to a maximum of 70 km without taking into account the orography of the terrain, being able to implement an algorithm that, depending on the orography or the terrain will reduce the radius of coverage, since, for mountainous areas, is rarely possible locating a radio station at a distance greater than 20 km.

Figure 4:
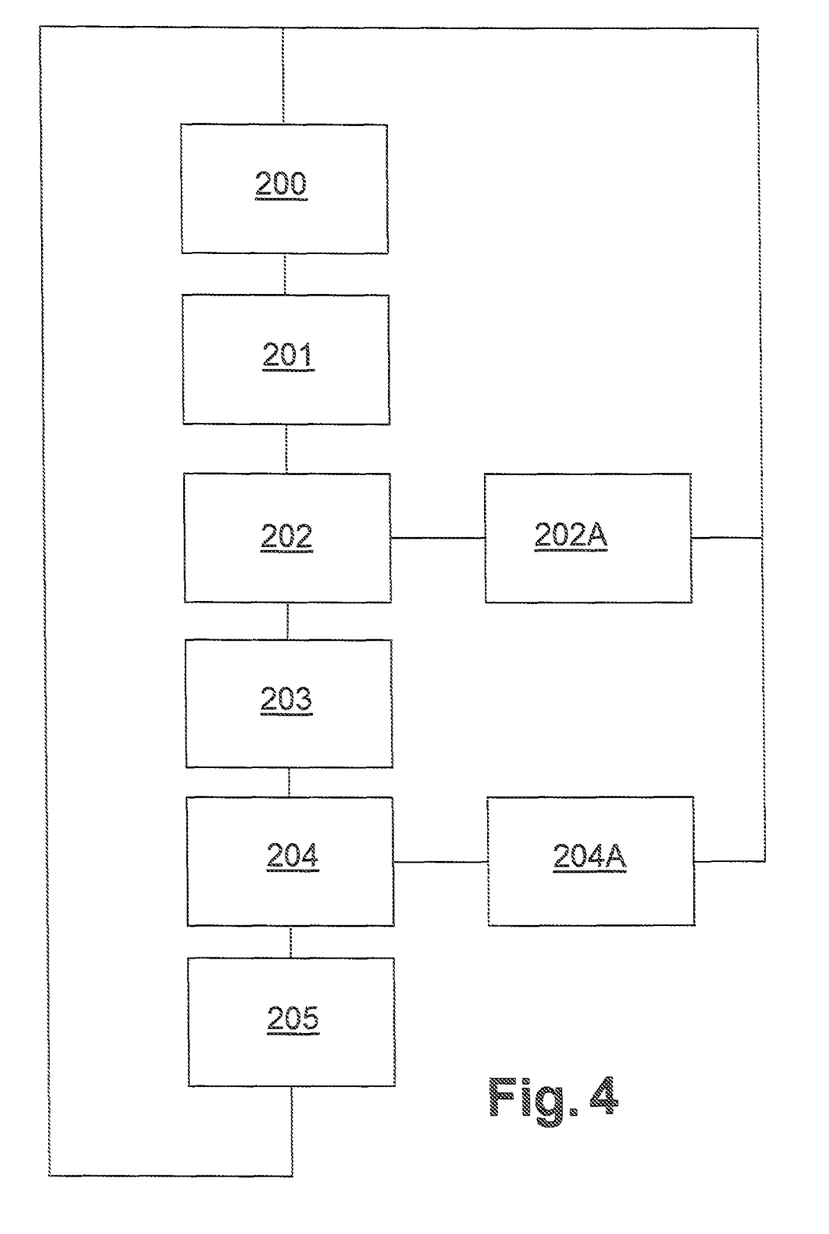
FIG. 4 shows a flow diagram of the method for automatically locating stations according to that claimed in the present invention, in a second practical embodiment, with location of the user position using mobile telephony cells.

In the next stage of the method, the device will define the location coordinate (224) of the device (210) based on the available mobile telephony cell and, therefore, of the user, establishing a search of the station suitable for this particular position, according to the following algorithm (23), as shown in the FIG. 4:

```
Start (200)
{
    If current_position = then "x" searchs_station_position (201);
    {
        if station_position == current_position (202);
        {
            then searchs_user_profile (203);
            if station_profile == user_profile (204);
            {
                then shows_dial (205);
            }
            if no message displayed ("no appropriate profile");
            station list (204A);
        }
        if no message displayed ("no stations in coverage"); (203A);
    }
}
in other case return (200);
```

That is, first of all, the matches (201) of the current position (24) will be sought with the station position (221), which has a radius of coverage variable depending on the orography, for example 70 km for flat terrain and 20 km for mountainous terrain.

At the time that match (202) in the second database of stations (22) is located, it seeks that the preferences (203) defined by the user in the first database of profiles (21) match between them (204), showing the dial in positive case (25, 205).

If not, and if the cause is the lack of profile (204A) a message of the type "out profile stations" will be display but listing stations with coverage, in case the user decides to change the profile or listen to another type of station regardless of the defined profile. Finally, if the cause is the lack of coverage of any station, a message of lack of coverage (203A) will be displayed.

The method of the invention, in its second practical embodiment, as a special feature, comprises a recording stage of a second favorite broadcast, in such a way that it can subsequently be broadcasted at the user's will. This means that, for example, if the route runs through an area where there is no coverage either there is no appropriate listening profile, the user is able to reproduce a broadcast that matches with their linking but it happened while he/she listened to another live program.

Similarly, the method in its second practical embodiment comprises a stage of reproduction of routines of radio and/or television broadcast depending on the route selected by the user. Thus, one possibility is to define a listening profile for a specific route, for example, always listening news when I return home or similar.

The method in its second practical embodiment regularly repeats every "t" time periods. As a special feature, the mobile device and the radio and/or television will be integrated, the dial being launched automatically to the radio and/or television and connecting.

In another peculiarity, the method in its second embodiment comprises an additional stage of GPRS data sending from the device to the radio and/or television station, being these data variable from the simple listening notification to participation in any type of competition, for example.

Example 3

Location of Radio Stations with on-Demand Downloading

Figure 5:
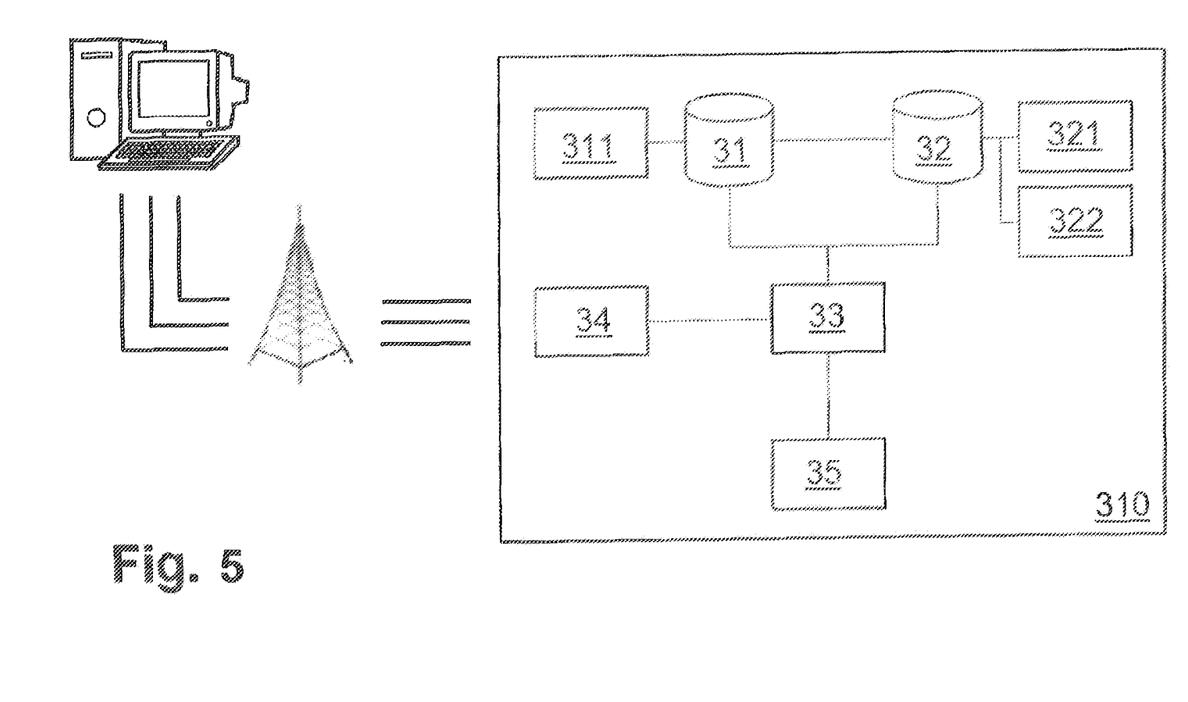
FIG. 5 shows a schematized diagram of the device object of the present invention in a third practical embodiment, with downloading of the on-demand radio station.
Figure 6:
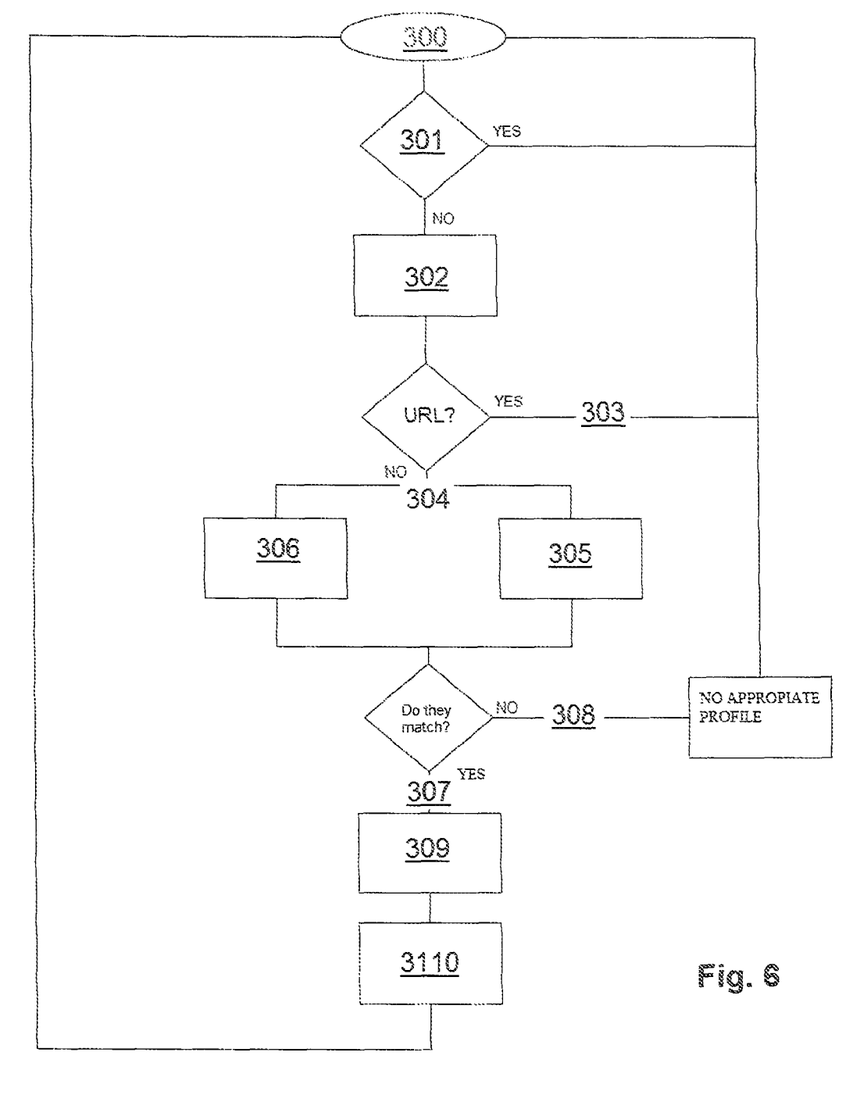
FIG. 6 shows a flow diagram of the method for automatically locating stations according to the third practical embodiment, with downloading of the on-demand radio station.

As can be seen in FIGS. 5 and 6, the device that implements the method object of the present invention in its third practical embodiment, starts defining at least one profile in a first database of profiles (31), integrated in the device (310) capable of remote data connection, via mobile phone, preferably GPRS/UMTS, or equivalent.

In this first database of profiles 31 the user will define, at least, a profile of listening by means of a plurality of fields 311, wherein these fields 311 are, by way of non-limitative example, the language of broadcast, the station category (radio formula, general, sports, etc.), and/or the type of programming broadcasted at that specific time (economic information, classical music, sports broadcasts, etc.).

Similarly, the second database of radio stations 32 defines a plurality of stations with their corresponding on-demand downloading URL addresses 321, being said stations categorized with the same fields as the first database of profiles 31.

In a second stage of the method a threshold of loss of coverage of the broadcast is established, from which the method will connect to a broadcasting URL address according to the algorithm shown in FIG. 6 and which is defined below:

The algorithm begins 300 analyzing whether there is or no coverage for the current broadcast 301; if so, the algorithm ends at the beginning 300, establishing a loop by checking that there is or no coverage for the broadcast.

In the event that the coverage is negative, the algorithm seeks the URL address 302 in the second database of stations 32, connecting with it, and consequently revealing if the link is available 303 or truncated 304. If it is available 303, a loop of analysis of coverage and connection with the URL address is established so that when the coverage of the broadcast is recovered, the on-demand broadcasting URL address is disconnected, thereby optimizing resources.

In the event that the current broadcasting URL link is truncated 304, all those stations 305 that correspond to the user profile 306 selected are sought. Once a match 307, 309 is found, the selected station(s) 309 is displayed, being shown to the user and/or selecting 3110 one of them by default, closing the loop. In the event that there is no match 308, a message of "not appropriate profile" will be displayed closing the loop at the start.

The method of the invention, in another particular embodiment, comprises a stage of downloading the remote podcast (podcasting is the distribution of multimedia files (usually audio or video) through a syndication system which allows the subscription and the use of a program which downloads it so the user listen it when he/she wants). There is no need to be subscribed to download them), for which, the database of radio stations must comprise an additional field 322 with the downloading URL of the file that will be stored in the memory of the device itself 310, being reproduced in the case that there are no matches 308 between profiles and stations or even in preference to the search for new stations, if the favorite URL is not available 304.

Similarly, the method in its second practical embodiment comprises a stage of reproduction of routines of radio and/or television broadcast depending on the route selected by the user, if the device comprises global location means of the type GPS. Thus, one possibility is to define a listening profile for a specific route, for example, it would be possible to define "always listening news on the route to work".

The method regularly repeats every "t" time periods. In a preferred embodiment, the mobile device and the radio and/or television will be integrated 35, the broadcast being launched automatically to the radio and/or television, and playing it.

In general, all of the above-mentioned in present specification is applied indistinctly, if it would want for television broadcasts.

The invention claimed is:

1. Method for automatically locating radio stations, comprising:
    (a) defining at least one user profile in an user's profile database, and wherein the user's profile comprises, at least, a listening preference by the user;
    (b) establishing at least one user location point of an user position; and
    (c) locating a match between the user's preferences set in (a) with the station or stations that have coverage at the user position set in (b);
    (d) indicating an exact dial of the station or stations located in (c); and
    (e) calculating a distance remaining to a next coverage area, wherein when the match is not located according with (c) displaying a message and a list of stations with coverage regardless of the defined user profile set in (a), and wherein if a cause of not locating the match is a lack of coverage of any station, displaying a message about lack of coverage;
    (f) sending data via general packet radio service (GPRS) to the radio and/or television station or otherwise to other GPRS devices; and
    (g) establishing when the coverage for a current broadcast is lost; and
    (h) seeking an Uniform Resource Locator (URL) address in the user's profile database of stations when there is no coverage for the current broadcast; and connecting with the URL address until the coverage for the current broadcast is recovered; and
    (i) wherein if the URL address of the current broadcast is not available all those stations that correspond to the selected user profile are sought, until a match is found, showing the selected stations, and showing to the user and/or selecting one of them by default.

2. The method according to claim 1 further comprising a recording stage of a second favorite broadcast, in such a way that it can subsequently be broadcasted at the user's will.

3. The method according to claim 1 further comprising a routine reproduction stage of radio and/or television broadcast depending on the route selected by the user.

4. The method according to claim 1, further comprising automatically running the dial which match the user's preferences with the station according with (d).

5. The method according to claim 1, wherein in the event that there is no match between profile and stations, a no-appropriate-profile message will be displayed.

6. The method according to claim 1, further comprising downloading of remote podcast, which is stored in memory, being reproduced in the case that: there are no matches between profiles and stations or if a favorite URL is not available.

7. Device for automatically locating radio stations comprising:
   a) a database of stations which includes the geographical location points and on demand broadcasting URL address as well as the dial; and
   a database of user profiles which also comprises at least one user profile configured according to the listening preferences of the user by means of a plurality of fields; wherein it comprises means for executing the method of claim 1.

8. A mobile phone comprising the device of the claim 7.

* * * * *